(12) United States Patent
Stobbe et al.

(10) Patent No.: US 6,538,560 B1
(45) Date of Patent: Mar. 25, 2003

(54) KEYLESS DEVICE FOR CONTROLLING ACCESS TO AUTOMOBILES AND KEYLESS METHOD FOR CHECKING ACCESS AUTHORIZATION

(75) Inventors: Anatoli Stobbe, Steinradweg 3, D-30890 Barsinghausen (DE); Volker Pretzlaff, Iserlohn (DE)

(73) Assignees: Leopold Kostal GmbH & Co., Ludenscheid (DE); Anatoli Stobbe, Barsinhausen (DE)

( * ) Notice: Subject to any disclaimer, the term of this patent is extended or adjusted under 35 U.S.C. 154(b) by 0 days.

(21) Appl. No.: 09/462,107
(22) PCT Filed: Jun. 22, 1998
(86) PCT No.: PCT/EP98/03799
§ 371 (c)(1),
(2), (4) Date: Feb. 16, 2000
(87) PCT Pub. No.: WO99/02377
PCT Pub. Date: Jan. 21, 1999

(30) Foreign Application Priority Data

Jul. 5, 1997 (DE) .......................... 197 28 761

(51) Int. Cl.⁷ ............................. G05B 23/00
(52) U.S. Cl. ..................... 340/5.72; 455/562
(58) Field of Search .......... 455/562; 340/5.72

(56) References Cited

PUBLICATIONS

PCT International Preliminary Examination Report, Oct. 13, 1999, International Application No. PCT/EP98/03799.

*Primary Examiner*—Michael Horabik
*Assistant Examiner*—M Shimizu
(74) *Attorney, Agent, or Firm*—Brooks & Kushman, P.C.

(57) ABSTRACT

A keyless vehicle access control system includes a transceiver in a vehicle and a mobile transponder. The transceiver includes transmitters for transmitting respective code signals and a key interrogation signal and is operable for receiving response and crypto-code signals. The transponder is operable for receiving the code and the key interrogation signals and for transmitting response and crypto-code. Upon the transponder receiving a code signal from a respective transmitter the transponder transmits a response signal indicative of the respective transmitter to the transceiver unit. Upon the transponder receiving a interrogation signal from the transceiver unit the transponder transmits a crypto-code signal to the transceiver unit. Upon the transceiver unit receiving a crypto-code signal from the transponder the transceiver checks the crypto-code signal to determine vehicle access authorization of the transponder. The transceiver actuates a vehicle access function associated with the respective transmitter upon determining that the transponder has authorization.

20 Claims, 2 Drawing Sheets

KEYLESS DEVICE FOR CONTROLLING ACCESS TO AUTOMOBILES AND KEYLESS METHOD FOR CHECKING ACCESS AUTHORIZATION

BACKGROUND OF THE INVENTION

1. Technical Field

The invention relates to the field of keyless access control devices. In particular, the invention relates to a keyless device for controlling access to motor vehicles having a transceiver device, which is allocated to the motor vehicle, and a mobile transponder, which transceiver device comprises a plurality of transmitters (low-frequency transmitters), which operate in the inductive frequency range and are allocated to different sides of the motor vehicle, for the purpose of transmitting a low-frequency code signal (LF signal), and a receiver unit, which operates in the high-frequency range (HF-range), for the purpose of receiving HF-response signals from the transponder, and which transponder comprises a receiver for the purpose of receiving the LF-signal and comprises an HF-transmitter for the purpose of transmitting an HF-response signal upon receiving the LF-signal.

2. Background Art

Furthermore, the invention relates to a keyless method for checking access authorization in motor vehicles.

This type of device and method have been disclosed in the papers "Ein Fahrzeugsicherungssystem ohne mechanischen Schlüssel" [a motor vehicle security system without a mechanical key] by Ch. Schneider and U. Schrey, published in: "Automobiltechnische Zeitschrift 96" [automotive magazine 96] (1994) no. 5 and "Smart-Card—Abschied vom Autoschlüssel" [The smart-card—The end of the car key] by U. Schrey, Ch. Schneider and M. Siedentrop, published in: "Siemens-Zeitschrift 1/96" [Siemens-Magazine 1/96]. The access control device described in these documents consists substantially of a transceiver device, which is allocated to the motor vehicle, and of a mobile transponder. The transceiver device comprises three transmitters (LF-transmitters) which operate in the inductive frequency range and of which one transmitter is allocated to the vehicle door, another is allocated to the passenger door and the third transmitter is allocated to the rear of the vehicle respectively. The transmitting antennae of the LF-transmitters are integrated into the respective side doors or into the rear bumper. Each LF-transmitter is connected to the door handle, allocated to the respective door, or to the boot button in such a manner that upon actuation thereof, the LF-transmitter which is allocated to this region of the vehicle transmits a low-frequency code signal (LF-signal). In contrast, the remaining LF-transmitters remain inactive and do not transmit any LF-signals.

The transceiver device which is allocated to the motor vehicle is also equipped with an HF-receiver for the purpose of receiving an HF-signal from the transponder. The transponder response signal received in the HF-receiver influences a control device which is equipped with a processor and in which the received response signal, which has been received as a crypto-code, is decrypted and checked for validity. If a match is established, a corresponding control signal is transmitted to the respective door locking mechanism for the purpose of unlocking the particular door, of which the door handle has been actuated beforehand.

The transponder is provided in the form of a so-called access card having an LF-receiver and a low-power HF-transmitter. The inductive receiving antenna is designed as a frame antenna and the high-frequency transmitting antenna is designed as a printed circuit board antenna. The LF-signal received by the LF-receiver of the transponder is decoded in the transponder. A microprocessor which is allocated to the transponder then calculates the codeword, which is contained in the LF-signal, using a security algorithm and transmits the result by means of the HF-transmitting unit to the HF-receiver of the transceiver device allocated to the motor vehicle.

Transmitting LF-signals for the purpose of "waking-up" the transponder serves to predetermine a functional radius limitation by virtue of the rapidly diminishing magnetic field. It is only possible to receive the transmitted LF-signal within one functional radius of 1.5 to 2 meters. This ensures that only those transponders which are actually located in this near-field region are woken up by the actuated LF-transmitter. The required actuation of a door handle or a boot button and the limitation of the functional radius serve to localize in a defined manner the transponder or the person carrying the transponder.

In order to render it possible to unlock the respective motor vehicle door as quickly as possible, modified door handle and lock mechanisms are used which render it possible for the door, on which the handle has been pulled, to open immediately. Even the provision of these type of mechanisms does not make it possible to shorten the period of time which the [sic] requires for the purpose of transmitting the data transmitted from the LF-transmitter to the transponder. This applies in particular if complicated crypto-codes are to be transmitted on this low-frequency path, since this type of approach requires a specific period of time owing to the low data transmission speed. However, the transmission of the decoded response signal of the transponder to the HF-receiver only slightly delays the beginning of the door release action.

A further keyless device for controlling access to vehicles is disclosed in DE 43 29 697 C2. This device utilizes a central LF-transmitter for the purpose of transmitting the low-frequency code signal. However, in the case of this device it is provided that the LF-transmitter transmits LF-signals cyclically in specific time intervals. Only when the transponder, which is allocated to the motor vehicle, is located in the functional radius of the LF-transmitter, is it woken up and transmits its response signal back. In order to trigger the release mechanism, it is not necessary in the case of this device to have to actuate a door handle or a boot button. Since it is not possible in the case of this device to localize the transponder for the purpose of unlocking merely specific doors, this access control device is only suitable for motor vehicles which have central locking. In the case of this previously known access control device the release action is occasionally subjected to a time delay as caused by virtue of the time required to transmit the possibly complicated LF-signal.

Furthermore, a keyless access control device is described in EP 0 767 286 A2. This system employs a mobile HF-transmitter which upon actuation of a transmission button transmits HF-signals to an HF-receiving unit, which is disposed in the motor vehicle, for the purpose of identifying an access authorization and for subsequently opening the vehicle doors. This mobile transmission part is also allocated an LF-transceiver unit which communicates with an LF-transceiver unit disposed in the motor vehicle, if the transmission part which is formed as a key is inserted into a corresponding lock in the motor vehicle, i.e. the ignition lock. The LF-communication serves to perform a predetermined dialogue; furthermore, energy is used over the LF-path for the purpose of charging up a battery which is allocated to the transmission part. Although this access control device is also a keyless access control device, it is still necessary, however, for an authorized user to actively operate the transmission button, in order to gain access to the motor vehicle. The only difference from a conventional way of locking the doors of a motor vehicle is that the transmission button is actuated instead of a lock.

SUMMARY OF THE INVENTION

On the basis of the prior art discussed in the introduction, it is, therefore, the object of the invention to propose a keyless device for controlling access to motor vehicles and to propose a keyless method of checking access authorization in motor vehicles, which device is not only suitable for unlocking individual doors or bonnets and boot lids but which also renders it possible to exchange complicated code and response signals without having to put up with any noticeable delay in the unlocking procedure.

On the one hand, this object is achieved by virtue of the fact that each LF-transmitter of the transceiver device, which is allocated to the motor vehicle, is allocated an LF-signal which can be differentiated from the remaining LF-transmitters and that both the transceiver device and the transponder are allocated an HF-transceiver unit for the purpose of performing on the HF-path a bi-directional question-response dialogue which checks the access authorization, wherein at least one HF-response signal of the transponder contains a response code, which identifies the respective LF-transmitter, upon reception of an LF-signal which is transmitted by an LF-transmitter.

Furthermore, this object is achieved in accordance with the invention by virtue of a keyless method of checking access authorization in motor vehicles comprising the steps of:

transmitting coded LF-signals within the inductive frequency range, by a plurality of LF-transmitters, of which one is allocated in each case to a side of the motor vehicle, receiving and identifying the LF-signal by means of a transponder, activating an HF-transceiver unit which is allocated to the motor vehicle, activating an HF-transceiver unit which is allocated to the transponder, performing a bi-directional question-response dialogue on the HF-path between the HF-transceiver unit of the motor vehicle and that of the transponder, which dialogue includes the transmission of a response code which identifies the respective LF-transmitter, from which the LF-signal has been received, and the transmission of a crypto-code from the transponder to the HF-transceiver unit which is disposed in the motor vehicle, identifying the crypto-code by the transceiver device, and opening one or several door locks corresponding to the particular door or doors, which is/are allocated the transmitted LF-signal and the LF-signal received by the transponder.

The transmission of different LF-signals which can be allocated to each LF-transmitter, which signal is received by the transponder and upon identifying the respective LF-transmitter is transmitted back in a response code to the transceiver device located in the motor vehicle, renders it possible to localize the transponder or the person who is carrying the transponder, without it being necessary to actuate a door handle or the like provided on the vehicle. The transponder is thus localized at the particular point in time, at which it is moved into the functional radius of an LF-transmitter. The LF-signal merely serves, so to speak, to "wake up" the transponder, wherein the wake-up signal is provided in the form of an LF-signal which is specific to each LF-transmitter. The signal or quantity of data which is/are to be transmitted can thus be reduced to a minimum.

The question-response dialogue between the transceiver device, which is allocated to the motor vehicle, and the transponder for the purpose of interrogating the access authorization is performed on an HF-path, wherein both the transceiver device, which is located in the motor vehicle, and the transponder comprise an HF-transceiver unit. By using an HF-path for the purpose of transmitting the actual signals which are provided for identification purposes, it is also possible to transmit complicated crypto-codes between the two units, without this causing the user to notice a delay in the unlocking mechanism. This feature significantly increases the system security which is also enhanced by virtue of the fact that the question-response dialogue only takes place on the HF-path if the transponder is located within the functional radius of an LF-transmitter and is thus coupled thereto in an inductive manner. It is provided that the question-response dialogue is interrupted if the said transponder goes beyond the functional radius, without an unlocking procedure having taken place.

Since the localization of the transponder and the question-response dialogue required for identifying the transponder are already in use when the transponder is moved within the functional radius of an LF-transmitter, for example by virtue of a user walking towards his/her motor vehicle, the remaining period of time it takes for the user to actually reach a vehicle door is used up for the purpose of carrying out the identification process. Taking as a prerequisite a functional radius of the LF-transmitter of 1.5 m and an approach movement of 1 m/s, in theory 1.5 seconds could be required for the identification process including the procedure of unlocking the respective door. This period of time is more than sufficient to be able to transmit even complicated crypto-codes via the HF-path in a question-response dialogue.

By the time the authorized user has arrived at the vehicle concerned, the door is always open.

The LF-signals of the individual LF-transmitters can be coded, for example, over different time slots. All of the LF-transmitters can transmit an identical LF-signal, wherein only one LF-transmitter transmits in each case its signal in a predetermined time interval, which is followed by a defined pause before a second LF-transmitter transmits its signal. This sequence is repeated in a cyclical manner over the number of LF-transmitters which are used. If a response signal from the transponder is received at a time close to the LF-signal of an LF-transmitter, it is possible to allocate the received response signal to the particular LF-transmitter which was the last one to transmit an LF-transmitter [sic]. It can be provided that upon reception of a response signal from the remaining LF-transmitters it is initially not possible to transmit any further LF-signals. In contrast, for the purposes of localization control, the particular LF-transmitter, which has been allocated the response signal, will transmit LF-signals once again.

In a further embodiment it is provided that the LF-signals of the individual LF-transmitters comprise a different code, so that code-dependent localization takes place.

In the case of cyclically transmitted LF-signals, it can be provided that the HF-transceiver unit is activated during transmission of the LF-code signal and is then powered down after a predetermined delay-time, if in the meantime no response signal has been received.

The LF-range is expediently located between 1 and 135 KHZ and lies, in particular, between 1 and 25 KHZ. It has been demonstrated that the low-frequency transmission frequencies are more insensitive in particular with regard to disruptive influences of the motor vehicle bodywork. If the transmission frequencies are above 135 KHZ, the vehicle bodywork can have an extremely unfavourable effect upon the functional radius of the LF-transmitters. The HF-frequency range is expediently between 100 MHZ and 10 GHZ.

In a further embodiment it is provided that the transceiver device which is allocated to the motor vehicle has a number of directional antennae corresponding to the number of LF-signals for the directional reception of the HF-response signals of a transponder, wherein the directional antennae are directed in the particular direction, in which the LF-transmitters transmit away from the motor vehicle. This type of feature renders it possible to achieve double localization of the transponder, wherein the first localization is achieved by way of the LF-transmitters and a further localization is achieved by way of the reception direction of the HF-response signal.

BRIEF DESCRIPTION OF THE DRAWINGS

Further advantages of the invention are evident in the remaining subordinate claims and the description hereinunder of a preferred exemplified embodiment. In the drawings.

DETAILED DESCRIPTION OF THE PREFERRED EMBODIMENT(S)

Figure 1:
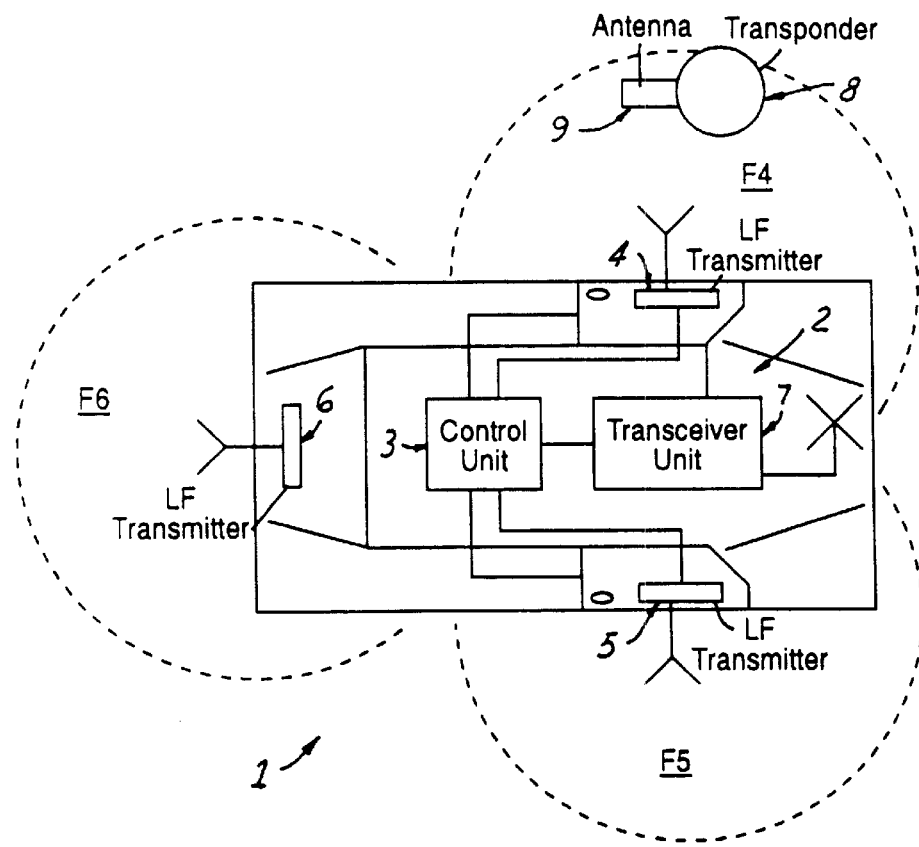
FIG. 1 shows a schematic illustration of a keyless device for controlling access to motor vehicles.

FIG. 1 illustrates in a schematic manner a motor vehicle 1 which is equipped with a keyless access control device. The access control device consists of a transceiver device 2 which is disposed in the motor vehicle 1 and which is connected to a control unit 3. The transceiver device 2 comprises three transmitters (LF-transmitters) 4, 5, 6 which function in the inductive frequency range, and an HF-transceiver unit 7. The LF-transmitters 4, 5, 6 are allocated to specific motor vehicle doors, wherein the LF-transmitter 4 is allocated to the driver door, the LF-transmitter 5 is allocated to the passenger door and the LF-transmitter 6 is allocated to the tail gate of the motor vehicle 1. The antennae of the LF-transmitters 4, 5, 6 are arranged in such a manner that it is possible to irradiate LF-signals away from the motor vehicle 1 in the most unhindered manner possible. The antennae can therefore be contained in the sealing system of the respective windows or doors or can be located for example behind the mirror glass of the outside mirrors. The LF-transmitters 4, 5, 6 are connected to the control unit 3 by means of corresponding control lines. The LF-transmitters 4, 5, 6 serve to transmit LF-code signals which are formed in such a manner that the LF-code signal of an LF-transmitter 4, 5 or 6 differs from the LF-code signals of the remaining LF-transmitters 4, 5, 6. In order to transmit the LF-code signals, a frequency between 1 and 25 KHZ is selected in an expedient manner. By designing the antenna in a corresponding manner, it is possible to use substantially the magnetic portion of the electromagnetic waves; in the said frequency range these are not damped substantially by either the human body or the bodywork of the motor vehicle. The intensity of the LF-signal is dimensioned in such a manner that each LF-transmitter has a functional radius $F_4$, $F_5$, $F_6$ of approximately 1.5 m.

The transceiver unit 7 serves to receive an HF-response-signal and to perform a question-response dialogue with a mobile transponder 8. The transponder 8 comprises an LF-receiver, whose antenna is a ferrite core antenna 9. The LF-receiver serves to receive LF-code signals of the transceiver device 2. The LF-receiver of the transponder 8 is connected with its output to the input of a microprocessor which upon reception of an LF-signal serves to initiate an HF-transceiver unit which is allocated to the transponder 8. Furthermore, the processor serves to introduce the received LF-code signal, which is allocated to a predetermined LF-transmitter 4, 5 or 6, into a response-signal which is to be transmitted by the HF-transceiver unit of the transponder 8 to the transceiver device 2 in the motor vehicle 1. For the purpose of supplying voltage, the transponder 8 contains a rechargeable battery, e.g. a lithium-ion battery, [not illustrated in detail].

Figure 2:
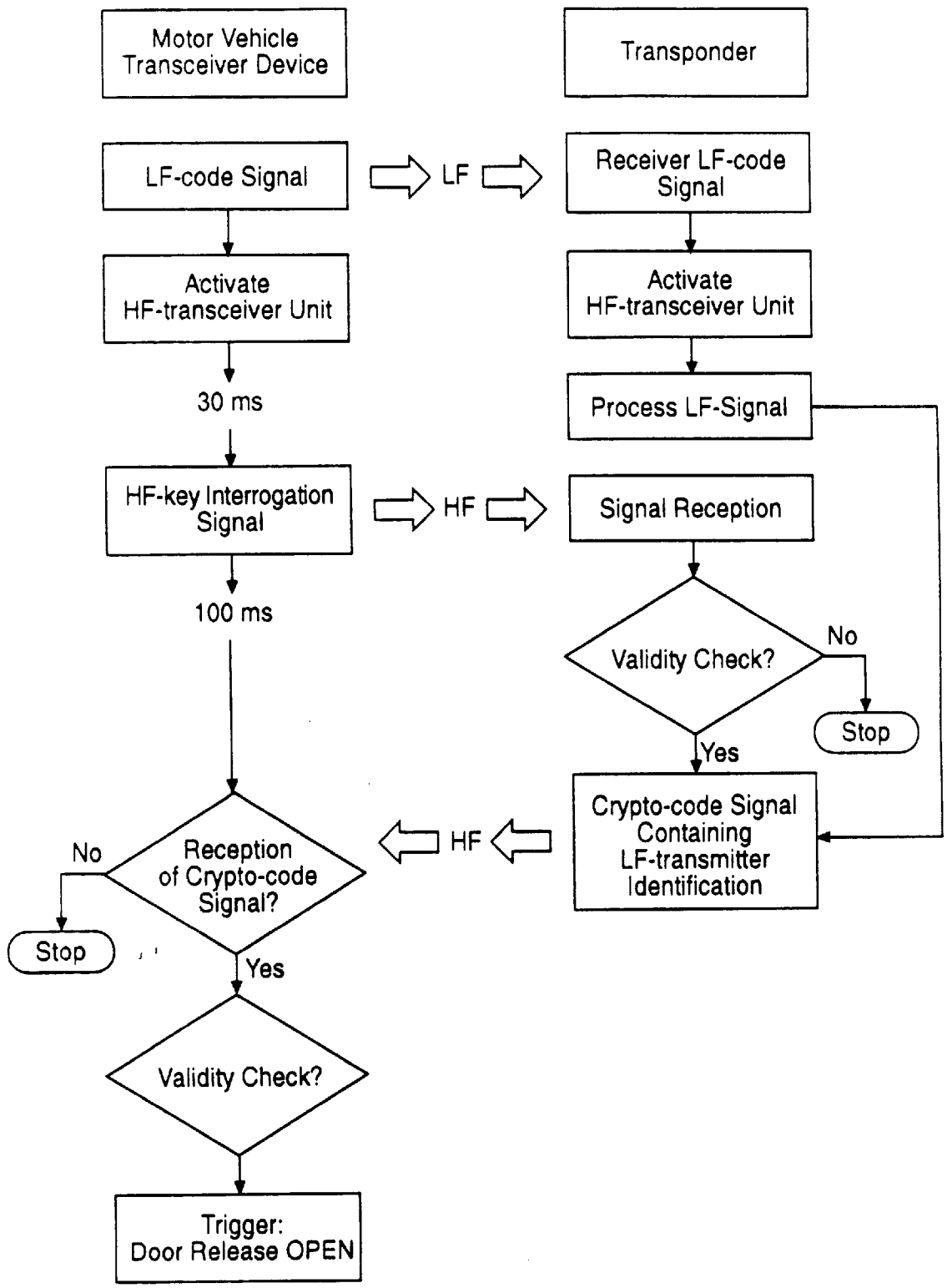
FIG. 2 shows a flow diagram of a question-response dialogue for the purpose of identifying the access authorization between a transceiver device, which is disposed in a motor vehicle, and a mobile transponder

A keyless device for controlling access authorization according to the access control device illustrated in FIG. 1 functions as follows and reference is made to the flow diagram in FIG. 2:

The LF-transmitters 4, 5, 6 transmit a coded LF-signal in a cyclical and time-shifted manner. The coding of the respectively transmitted LF-signal serves to identify the LF-transmitter 4, 5 or 6 which is transmitting the LF-signal. Furthermore, the LF-code signal serves to "wake up" the transponder 8. In the case of the exemplified embodiment illustrated in FIG. 1, three LF-transmitters 4, 5, 6 are provided, so that the amount of data contained in a LF-code signal must only be large enough to identify in a clear manner an LF-transmitter 4, 5 or 6. For this purpose, the LF-code signal of the LF-transmitter 4 consists of the binary code [01], the LF-signal of the LF-transmitter 5 consists of the binary code [10] and the LF-code signal of the LF-transmitter 6 consists of the binary code [11].

In dependence upon the particular side from which the person approaches the motor vehicle, an LF-code signal which is characteristic of this side of the vehicle is received by the transponder 8 which an authorized person carries towards the vehicle 1, for example, in his/her jacket pocket. If the person walks towards the driver door, the binary code [01] of the LF-code signal of the LF-transmitter 4 is received as the functional radius $F_4$ is entered. At this point in time the authorized person is still at a distance of 1.5 m from the driver door.

The transponder 8 identifies the LF-code signal and initiates the HF-transceiver unit allocated thereto. At the same time, the received LF-code signal is calculated in the processor allocated to the transponder 8 such that said code signal is incorporated into an HF-response signal.

The HF-transceiver unit 7 of the transceiver device 2 disposed in the vehicle 1 is initiated at the same time as the LF-code signal is transmitted in a cyclical manner. After a predetermined delay time which can last about 30 ms, the transceiver device 7 transmits a key interrogation signal to the HF-transceiver unit which is located in the transponder 8. The delay time is provided to ensure that the key interrogation signal is only transmitted when the HF-transceiver unit of the transponder 8 is initiated and switched on. The key interrogation signal serves to initiate the HF-response-question dialogue between the transceiver device 2 and the transponder 8. During this first interrogation, there is an interrogation as to which "key" the transponder 8 refers to. This general interrogation is provided in order to ascertain at the commencement of the question-response dialogue, whether the transponder 8 can belong at all to the group of possible authorized devices and/or to initialize the interrogation key. The key interrogation signal thus contains only a short piece of information which contains only a small data transmission quantity. As a consequence, this ensures that crypto-codes are then only actually transmitted if it has previously been identified that the transponder 8 belongs to the group of possible authorized devices.

This key interrogation signal is received by the HF-transceiver unit of the transponder 8 and is then examined as to whether the short piece of information received is associated with the motor vehicle 1 allocated to the transponder 8. In the event that an allocation is not ascertained, the HF-transceiver unit of the transponder 8 is then powered down. However, if the transponder 8 identifies that the received short information signal is correct, then it transmits a crypto-code on the HF-path to the transceiver device 2 of the motor vehicle 1. This response signal also contains a code for identifying the particular LF-transmitter 4, 5 or 6, from which the received LF-code signal has been transmitted. By transmitting this localization signal back and by receiving same by means of the HF-transceiver unit 7, it is possible to use the control unit 3 to actuate the particular unlocking mechanism corresponding to the particular LF-transmitter 4, 5 or 6 whose signal has been received beforehand. The crypto-code signals can be exchanged on the HF-path on a number of occasions.

The response signal of the transponder 8 which is received by the HF-transceiver unit 7 is decrypted and is compared with one or several desired values, whereupon the access authorization of the person carrying the transponder is ascertained. When a valid response-code signal is received, a trigger signal which in this exemplified embodiment is directed to the diver door is produced by the control unit 3 for the purpose of unlocking said driver door.

In the event that after transmitting the key interrogation signal by virtue of the HF-transceiver unit 7, no response signal of the transponder has been received within a predetermined time period of approximately 100 ms, the question-response dialogue is terminated and the HF-transceiver unit 7 is powered down. The cyclical transmission of LF-code signals and the similarly cyclical powering up and down of the HF-transceiver unit serve to minimize the power consumption.

The remaining time between the transponder 8 entering into the functional radius $F_4$ of the LF-transmitter 4, which is allocated to the driver door, and the authorized person arriving at the driver door, which requires approximately two steps, is sufficient to ensure that the entire question-response dialogue has been performed along with the process of "waking up" the transponder 8 and the driver door is unlocked. The authorized person is then able to get into his/her motor vehicle 1 straight away.

At a suitable site, the motor vehicle 1 is provided with a transponder receiving arrangement, into which the transponder 8 can be inserted with its ferrite core antenna 9. This transponder receiving arrangement is allocated an inductive charging device, so that the rechargeable battery of the transponder 8 is charged up when the motor vehicle 1 is being used. The transponder receiving arrangement is also allocated a further device for the purpose of performing question-response dialogues, which are performed in a corresponding manner to the question-response dialogue described above, however with the aim of switching off a vehicle immobilizer and/or interrogating or initiating different security or operating states.

The transponder 8 has been woken up by receiving the LF-code signal of an LF-transmitter 4, 5 or 6 and has then initiated the HF-transceiver unit allocated thereto and has processed the LF-code signal with regard to the LF-transmitter identification contained therein. Therefore, it is possible to form the transponder 8 in such a manner that it initiates different functions—in a simultaneous or time-shifted manner depending upon the design—when several LF-code signals are received from different code transmitters. The reception of several LF-code signals from several LF-transmitters always only takes place if the authorized person is located together with the transponder 8 in the motor vehicle 1. Instead of inserting the transponder 8 into a corresponding transponder receiving arrangement, it could be provided that in the event of signals being received in this manner, the vehicle immobilizer is switched off as a further control function.

When getting out of the motor vehicle 1, the authorized person then puts the transponder 8 into his/her pocket and carries it. This automatically locks the vehicle doors or the vehicle door 4, as explained in the illustrated exemplified embodiment. The HF-path between the HF-transceiver unit 7 and the HF-transceiver unit of the transponder 8 is utilized for the purpose of carrying out a question-response dialogue relating to the procedure of leaving the motor vehicle 1. An inductive coupling is not required for this question-response dialogue because it has been identified beforehand that the transponder 8 or the person who has got out of the vehicle is authorized. The transmission power of the HF-transceiver units 7 can transmit initially with a relatively low transmission power, since the authorized person is still in close proximity to the motor vehicle immediately after having left it. As the person moves away from the vehicle, the transmission power is then readjusted for as long as until the provided question-response dialogue is terminated. This can also be way outside the respective functional radius $F_4$, $F_5$ and $F_6$ and can amount to several tens of meters. This question-response dialogue also contains a locking signal, which indicates to the authorized person that the motor vehicle 1 is actually locked. This signal can either be a light display 10 on the transponder 8 or an acoustic signal. It is also possible to store this signal and recall it for the purpose of informing the user.

Figure 3:
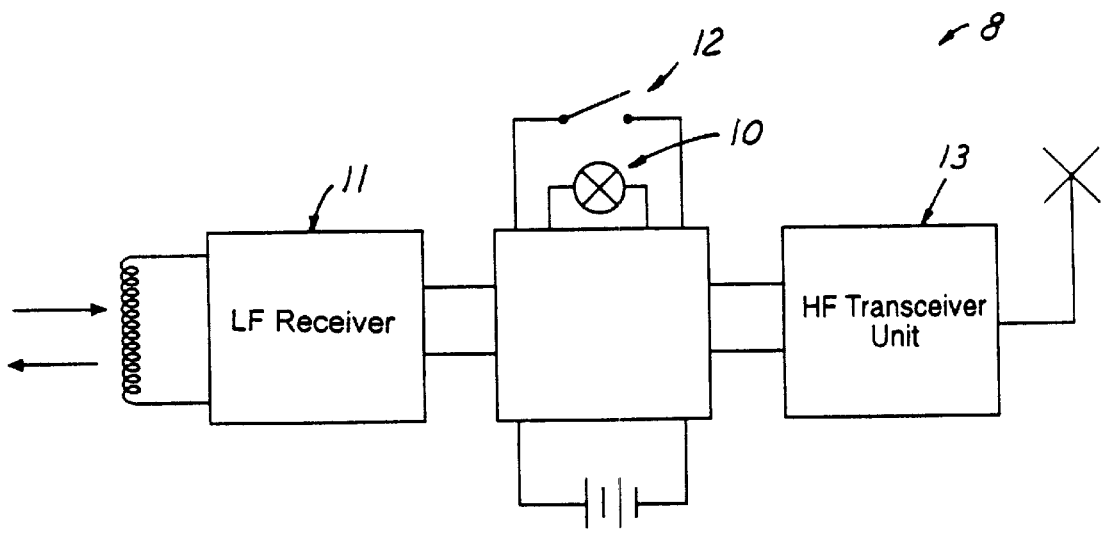
FIG. 3 shows a schematic block diagram of a transponder for use in a keyless device for controlling access to motor vehicles.

The block diagram of the transponder 8 is illustrated in a schematic manner in FIG. 3. It is evident in this Figure that it is possible by way of the LF-path to receive, in this case, the wake-up signal, a data reception or even a power reception by way of the LF-receiver 11. The arrows indicate that the transponder 8 can also use the LF-path for the purpose of transmitting data.

Furthermore, the transponder 8 is allocated a manually operable HF-transmission button 12, the actuation of which by way of the HF-transceiver unit 13, which is allocated to the transponder 8, renders it possible for a signal to be transmitted via the HF-path of the HF-transceiver unit 7 in the motor vehicle 1. This type of function of the transponder 8 can be used, for example, in order to transmit a signal to the motor vehicle from a greater distance, whereupon this signal is noticed in a certain manner, e.g. by switching on the interior lighting, by sounding the horn or by setting off the alarm installation. This type of feature provides a particularly convenient method of finding one's car in large car parks. The motor vehicle could also be unlocked in this manner by means of this signal or in a further signal. In this case, the authorization or identification interrogation can also be triggered by the HF-signal by actuating the HF-transmission button 12. In contrast to the previously described mode of function of the transponder, the user actually has to operate this HF-transmission button.

LIST OF REFERENCE NUMERALS 1 motor vehicle
2 transceiver device
3 control unit
4 LF-transmitter
5 LF-transmitter
6 LF-transmitter
7 transceiver unit
8 transponder
9 rod antenna
10 light display
11 LF-receiver
12 HF-transmission button
13 HF-transceiver unit
$F_4$ functional radius
$F_5$ functional radius
$F_6$ functional radius

What is claimed is:

1. A keyless device for controlling access to a motor vehicle, the device comprising:
   a transceiver device in a motor vehicle, the transceiver device having a plurality of transmitters for transmitting respective code signals, the transceiver device further having a transceiver unit for transmitting a key interrogation signal and for receiving a response signal and a crypto-code signal; and
   a mobile transponder for receiving the code signals and the key interrogation signal and for transmitting a response signal and a crypto-code signal;
   wherein upon the transponder receiving a code signal from a respective transmitter of the transceiver device the transponder transmits a response signal indicative of the respective transmitter of the transceiver device to the transceiver unit of the transceiver device, and wherein upon the transponder receiving a key interrogation signal from the transceiver unit of the transceiver device the transponder transmits a crypto-code signal to the transceiver unit of the transceiver device;
   wherein upon the transceiver unit of the transceiver device receiving a crypto-code signal from the transponder the transceiver device checks the crypto-code signal to determine motor vehicle access authorization of the transponder;
   wherein the transceiver device actuates a motor vehicle access function associated with the respective transmitter of the transceiver device upon determining that the transponder has proper motor vehicle access authorization.

2. A keyless device for controlling access to a motor vehicle, the device comprising:
   a transceiver device in a motor vehicle, the transceiver device having a plurality of transmitters for transmitting respective code signals, the transceiver device further having a transceiver unit for transmitting a key interrogation signal and for receiving a response signal and a crypto-code signal; and
   a mobile transponder having a receiver for receiving the code signals and the key interrogation signal, the transponder further having a transmitter for transmitting a response signal and a crypto-code signal;
   wherein upon the receiver of the transponder receiving a code signal from a respective transmitter of the transceiver device the transmitter of the transponder transmits a response signal indicative of the respective transmitter of the transceiver device to the transceiver unit of the transceiver device, and wherein upon the receiver of the transponder receiving a key interrogation signal from the transceiver unit of the transceiver device the transmitter of the transponder transmits a crypto-code signal to the transceiver unit of the transceiver device;
   wherein upon the transceiver unit of the transceiver device receiving a crypto-code signal from the transmitter of the transponder the transceiver device checks the crypto-code signal to determine motor vehicle access authorization of the transponder;
   wherein the transceiver device actuates a motor vehicle access function associated with the respective transmitter of the transceiver device upon determining that the transponder has proper motor vehicle access authorization.

3. The device of claim 2 wherein:
   each transmitter of the transceiver device is positioned at separate locations within the motor vehicle, wherein each transmitter of the transceiver device transmits a respective code signal in a transmission region adjacent to the location of the transmitter in the motor vehicle.

4. The device of claim 2 wherein:
   the transmitters of the transceiver device transmit respective code signals using a low frequency carrier signal, the transceiver unit of the transceiver device transmits the key interrogation signal using a high frequency signal, and the transmitter of the transponder transmits the response signal and the crypto-code signal using a high frequency carrier signal.

5. The device of claim 4 wherein:
   the low frequency carrier signal falls within a range of 1 KHZ and 135 KHZ.

6. The device of claim 4 wherein:
   the high frequency carrier signal falls within a range of 1 MHZ and 10 GHZ.

7. The device of claim 2 wherein:
   the code signals transmitted by the respective transmitters of the transceiver device are time slot coded so that the code signals are transmitted periodically in respective time intervals.

8. The device of claim 2 wherein:
   the code signals transmitted by the respective transmitters of the transceiver device include different codes.

9. The device of claim 2 wherein:
   the code signals, the key interrogation signal, the response signal, and the crypto-code signals are phase locked.

10. The device of claim 2 wherein:
   a transceiver device is operable to identify simultaneously a plurality of transponders by using anti-collision protocol.

11. The device of claim 2 wherein:

the transceiver unit of the transceiver device has a plurality of antennas each corresponding to a respective transmitter of the transceiver device for receiving the response signal and the crypto-code signal, wherein each antenna is directed in the direction in which the respective transmitter of the transceiver device transmits.

12. The device of claim 2 wherein:

the transponder includes a reception coil for charging a battery of the transponder.

13. The access control device of claim 2 wherein:

the transponder has a ferrite core antenna.

14. The device of claim 2 wherein:

the transponder has an air coil antenna.

15. The device of claim 2 wherein:

the transponder has a manually operable HF transmission button for transmitting a signal to the transceiver unit of the transceiver device.

16. A keyless method for checking access authorization in motor vehicles, the method comprising:

transmitting respective code signals from a plurality of transmitters of a transceiver device in a motor vehicle;

transmitting a key interrogation signal from a transceiver unit of the transceiver device;

receiving the code signals with a receiver of a mobile transponder;

receiving the key interrogation signal with the receiver of the mobile transponder;

transmitting a response signal from a transmitter of the mobile transponder upon the receiver of the transponder receiving a code signal from a respective transmitter of the transceiver device, the response signal indicative of the respective transmitter of the transceiver device;

transmitting a crypto-code signal from the transmitter of the transponder upon the receiver of the transponder receiving a key interrogation signal from the transceiver unit of the transceiver device;

receiving the response signal and the crypto-code signal with the transceiver unit of the transceiver device;

checking the crypto-code signal to determine motor vehicle access authorization of the transponder with the transceiver device upon the transceiver unit of the transceiver device receiving a crypto-code signal from the transmitter of the transponder; and actuating a motor vehicle access function associated with the respective transmitter of the transceiver device using the transceiver device upon the transceiver device determining that the transponder has proper motor vehicle access authorization.

17. The method of claim 16 further comprising:

positioning each transmitter of the transceiver device at separate locations within the motor vehicle, wherein transmitting respective code signals from a plurality of transmitters of a transceiver device in a motor vehicle includes transmitting a respective code signal in a transmission region adjacent to the location of the transmitter in the motor vehicle.

18. The method of claim 16 wherein:

transmitting respective code signals includes transmitting respective code signals using a low frequency carrier signal, and transmitting a key interrogation signal, a response signal, and a crypto-code signal includes transmitting a key interrogation signal, a response signal, and a crypto-code signal using a high frequency carrier signal.

19. The method of claim 16 wherein:

the respective codes signals transmitted by the transmitters of the transceiver device are time slot coded so that the code signals are transmitted periodically in respective time intervals.

20. The method of claim 16 wherein:

the respective code signals transmitted by the transmitters of the transceiver device include different codes.

* * * * *